Nov. 15, 1960 O. C. WINZEN 2,960,282
BALLOON SEAL OR THE LIKE HAVING LOAD BEARING
ELEMENT AND METHOD OF PRODUCING THE SAME
Filed April 30, 1956 2 Sheets-Sheet 1
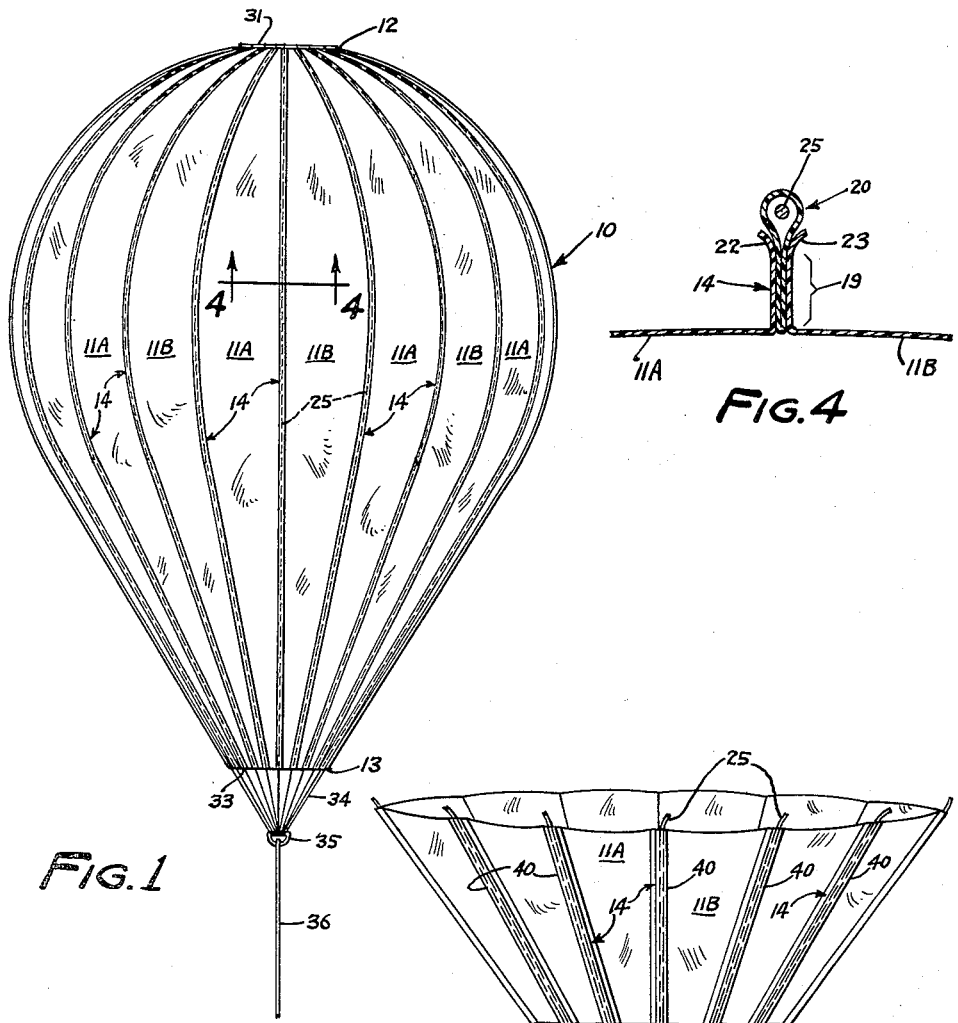
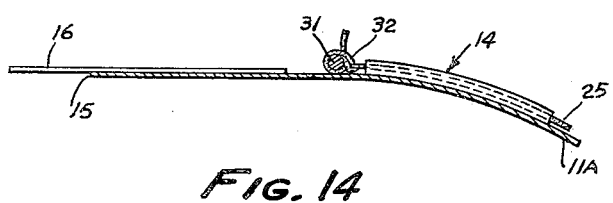
INVENTOR.
OTTO C. WINZEN
BY
Moore, Dugger, White & Burd
ATTORNEYS Nov. 15, 1960   O. C. WINZEN   2,960,282
BALLOON SEAL OR THE LIKE HAVING LOAD BEARING
ELEMENT AND METHOD OF PRODUCING THE SAME
Filed April 30, 1956   2 Sheets-Sheet 2
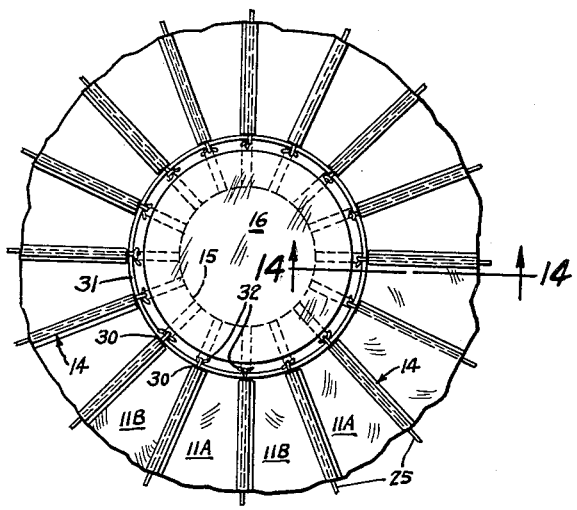
FIG. 3
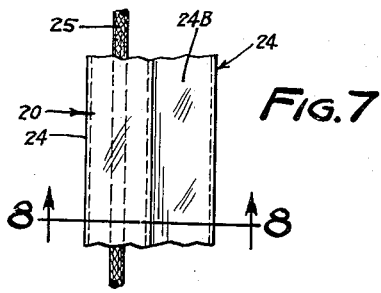
FIG. 7
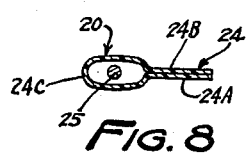
FIG. 8
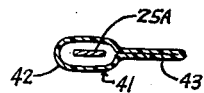
FIG. 9
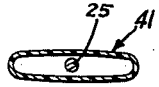
FIG. 11
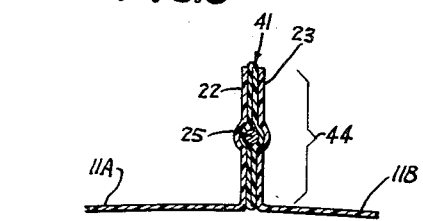
FIG. 5
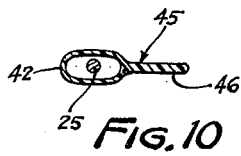
FIG. 10
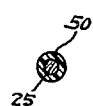
FIG. 12
FIG. 6
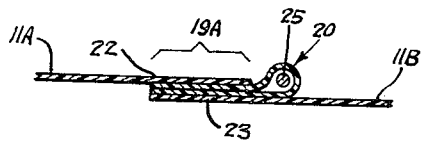
FIG. 13
INVENTOR.
OTTO C. WINZEN
BY
Moore, Dugger, White & Burd
ATTORNEYS

United States Patent Office 2,960,282
Patented Nov. 15, 1960

2,960,282

BALLOON SEAL OR THE LIKE HAVING LOAD BEARING ELEMENT AND METHOD OF PRODUCING THE SAME

Otto C. Winzen, St. Paul, Minn., assignor to Winzen Research, Inc., Minneapolis, Minn., a corporation of Minnesota Filed Apr. 30, 1956, Ser. No. 581,752

2 Claims. (Cl. 244—31)

This invention relates to balloon seals and the like and specifically relates to improvements in seals for joining adjacent gores or sections of a balloon to provide a gasproof envelope, the seals having embodied therein a unique tension or load supporting means. While this invention is particularly suitable for use in balloon construction and for providing novel supporting means for supporting loads from balloon envelopes, it is likewise useful in other instances, such as where two flexible members are joined or sealed together and it is desired to provide a tension or linear load supporting and reinforcing member as a part of such seal. The invention is an improvement over the structure shown in co-pending application Serial No. 489,374 now Patent No. 2,858,090.

In the manufacture and utilization of balloons, particularly the widely used present day balloons comprising a thin film of plastic or synthetic resinous material, there is always the problem of providing a relatively light secure gas-proof envelope yet readily providing suitable means for supporting a load from such an envelope. One attempt to solve such problem is shown in Patent No. 2,526,719.

Broadly speaking, this invention comprises a balloon and linear seal having a flexible linear reinforcing member therein, the reinforcing member extending from at least one terminated edge of the seal for securing to supporting structure or structure to be supported.

It is an object of this invention to provide a new and useful load supporting means for supporting a payload from a relatively fragile balloon envelope and a new and useful method for making the same.

It is a further object of this invention to provide new and useful reinforcing seals for adjacent gores of a balloon or the like and a new and useful method for making the same.

Still a further object of this invention is to provide a new and useful tension or load supporting member secured to a balloon envelope or the like.

A still further object of this invention resides in the provision of new and useful reinforcing seals for adjacent gores of a balloon or the like having an unsecured filamentous member extending therealong.

A still further object of this invention is to provide a new and useful reinforcing member for a balloon seal or the like.

Still another object of the invention resides in a provision of a reinforced balloon seal or the like embodying a filamentous reinforcing member whereby a load may be suspended therefrom.

Further objects of the invention are to provide new and useful balloon seal constructions or the like providing a tensile load supporting member; new and useful tensile load supporting members for balloons; and to provide new and useful methods for producing such structure.

Throughout the specification and claims the invention will be described specifically with reference to balloons, but it is to be understood that the invention likewise may be utilized in other instances where it is desired to provide a new and useful tensile or load supporting member secured to a flexible material as between adjacent gores of a balloon.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

Figure 1 is an elevational view of a balloon embodying the instant invention;

Figure 2 is an enlarged fragmentary view similar to Figure 1 but showing details of the balloon harness construction;

Figure 3 is a fragmentary top plan view of the balloon of Figure 1;

Figure 4 is a view taken along the line and in the direction of the arrows 4—4 of Figure 1;

Figure 5 is a view similar to Figure 4 but showing a modified form of seal or seam construction;

Figure 6 is a view similar to Figure 5 but showing a second modified form of construction;

Figure 7 is an enlarged fragmentary elevational view of the load bearing assembly of the construction of Figure 5;

Figure 8 is a view taken along the line and in the direction of the arrows 8—8 of Figure 7;

Figure 9 is a view similar to Figure 8 but showing a modified form of load bearing assembly;

Figure 10 is a view similar to Figure 8 but showing a second modified form of load bearing assembly;

Figure 11 is a view similar to Figure 8 but showing a third modified form of load bearing assembly;

Figure 12 is a view similar to Figure 8 but showing a fourth modified form of load bearing assembly;

Figure 13 is similar to Figure 5 and showing an alternate form of seam construction; and Figure 14 is an enlarged fragmentary sectional view taken on the line 14—14 of Figure 3.

Reference is now made to the drawings and particularly to Figure 1. There is shown a balloon generally designated 10 which comprises a plurality of gores, alternate members of which are designated 11A and intermediate members of which are designated 11B. These gores extend vertically from the apex end 12 of the balloon to the appendix end 13. The gores are usually of uniform shape, extend vertically of the balloon as shown in Figure 1, and have a width dimension greater at approximately the center of the balloon than at either the apex end 12 or the appendix end 13.

The gores, comprising the balloon envelope, may be made of a variety of materials, but should comprise a sealable, preferably heat-sealable, thin, smooth, tough, pliable, membranous, relatively inextensible film which is relatively impermeable to the passage of gaseous material. A superior material having these characteristics is polyethylene. However, other materials available for use in forming a relatively thin, impermeable thermoplastic synthetic resinous film of the gores, which comprises the envelope of the balloon, are such materials as "Cry-O-Rap," butadiene-acrylonitrile copolymer, manufactured by the Dewey & Almy Chemical Company; moisture resistant cellophanes, that is, regenerated cellulose sheets coated with lacquers or the like to improve their moisture resistance; vinyl chloride-vinylidene chloride copolymers; plasticized rubber hydro-chloride which is readily sealed by heat and is available in the form of transparent sheets and under the trade-mark "Pliofilm" from the Goodyear Tire & Rubber Company; thermoplastic resins produced by the polymerization of vinylidene chloride alone or with other monomers under the trade-mark "Saran" by Dow Chemical Co.; plasticized vinyl chloride-vinyl acetate copolymers available from many manufacturers; butadiene-styrene copolymers; and many other resinous materials may be used either as films or in laminates. Polyethylene film has been found superior.

The adjacent edges of the gores are bonded together with the load bearing assembly therebetween, and as preferred (when thermoplastic, by heat-sealing) to produce a finned juncture generally designated 14, as illustrated in Figure 4.

As illustrated in Figures 1–3, the balloon is provided with the open appendix 13. However, a suitable appendix skirt may be provided if desired for this invention may be used with open appendix balloons, pressurized balloons, apex inflated balloons, etc.

As shown in Figure 3, the gores 11A and 11B terminate at 15 and a cap 16 preferably of the gore material is secured thereover and preferably heat-bonded thereto to provide a complete gas-proof envelope (but in this instance having an open appendix).

Each one of the junctures 14 includes a linear load bearing assembly 20 throughout a portion thereof, in this instance extending from the appendix end 13 of the balloon to the apex end 12. As shown best in Figure 4, gore 11B is turned at 23 and gore 11A is turned at 22 to provide substantially co-extensive turned portions or edges in superimposed relation. The edges 22 and 23 are placed in superimposed juxtaposition with the load bearing assembly 20 therebetween. Edges 22 and 23 are then sealed to assembly 20 as throughout the area under the bracket 19.

Assembly 20, as shown best in Figures 7 and 8, comprises a reinforcing filamentous element or tensile member 25. Member 25 is in cable form and may be comprised of nylon cable, or woven nylon cord, glass fiber filament, roving or cord, or other flexible reinforcing member having a high tensile strength and relative inextensibility such as synthetic resinous filaments, metallic filaments, etc. all within the spirit and scope of this invention. It is preferred to use synthetic resinous filaments such as nylon cord.

Tape 24 in this instance comprises a width folded upon itself to form superimposed flanges 24A and 24B, which are heat-sealed together to provide a loose, somewhat ovular pocket 24C in which the cable 25 is positioned. Portions 24A and 24B are preferably heat-bonded together and then the reinforcing assembly so produced including cable 25 is positioned as shown in Figure 4 with portions 24A and 24B between turned ends 22 and 23 with portion 24C extending therefrom so that an externally turned fin comprising the assembly 20 and turned portions 22 and 23 is provided, integrally united, preferably by heat-bonding although adhesive may be used as desired.

Each of the tape members 24 terminates at 30 but the cables 25 are looped around a ring 31 and tied thereto at 32 as shown in Figure 3. If desired, rather than being secured to the ring the apex end of the cables may be secured to an apex clamp of the type shown in co-pending application Serial No. 516,436.

The tapes 24 likewise terminate at 33 at the appendix end of the balloon but the cables extend at 34 and are tied or otherwise secured to a D-ring 35 in turn secured to a load cable 36 at the other end of which is secured a payload.

As shown in Figure 5, the assembly 20 also may be secured to either one of the turned edges 22 or 23 in this instance 23 and thus heat-sealed to the exterior thereof rather than being interposed between the two edges 22 and 23 as in Figure 4.

In either event, the portions 40 of the extending fin junctures will be turned and drawn into flatwise relation with the balloon envelope by virtue of the load on cable portions 34 as shown in Figure 2.

In Figure 9 there is shown a modification of the assembly 20 in which the cable element comprises a flat strap-like member 25A having a rectangular cross-section rather than a member having a circular cross-section as shown in Figure 8. In this instance the tape 41 similar to tape 24 is extruded as a tube and the tube is flattened at 43 to give loop portion 42 similar to portion 24C and a tail or edge 43 comprising the flattened portions. To state this another way, tape 41 comprises a tube rather than a member having folded over portions, a part of the tube being brought into abutment at 43 and the remainder of the tube forming the loop portion 42 in which the member 25A is seated.

In Figure 11 there is shown a modification of assembly 20 in which a tube 41, identical with the tube used in the modification of Figure 9, has the reinforcing element 25 positioned in the center thereof rather than at one side thereof as shown for element 25A in Figure 9, and the tube 41 is then positioned between portions 22 and 23 as shown in Figure 6 and the whole heat-sealed under the bracket 44 so that the tube collapses into abutment with itself and with element 25.

In Figure 10 the tape 45, similar to tape 43 is extruded, having an integral edge or tail 46 and the loop portion 42.

Thus, in Figure 8, there is provided a tape assembly having a reinforcing cable positioned in a loop formed by folding a sheet around the cable and bringing the folded edges into flat relation and sealing them together.

In Figure 9 there is likewise provided a loop and edges in flatwise relation, but the flatwise edges are part of a tubular tape. Such tubular tape is likewise used in Figures 11 and 6. In the embodiment of Figures 11 and 6 cable 25 does not readily move axially with reference to tube 41 as it does in the embodiments of Figures 4, 5, 7 and 13.

In Figure 10, there is likewise provided a loop but this is joined to a tail or integral edge and there is no bringing of edges into flatwise relation as in Figure 8, or portions of a tube in flatwise relation as in Figure 9.

In Figure 12 the cable 25 is extruded with a covering of synthetic resinous material 50 thereover, somewhat in the manner of insulation and with this modification the cable 25 and covering 50 may be bonded between edges 22 and 23 or to the exterior thereof as desired. In this less preferred modification cable 25 is not axially slidable with reference to its covering 50, and covering 50 is chosen to provide a thermoplastic readily bondable sheath, as of polyethylene.

While it is highly preferred to use a gore and tape structure of synthetic resinous material which may readily be heat-sealed to one another, such as polyethylene, and having the same co-efficient of expansion, it is to be understood that the tape and the gores may be adhesively secured together as a less preferred embodiment. The cable may or may not be capable of being heat-sealed to the tape or sheath with which it is associated. It has been found of particular importance to use thermoplastic films for the tapes and thermoplastic films for the gores which may readily bond together and to use thermoplastic films having substantially identical co-efficients of expansion.

In the embodiment shown in Figure 13, the assembly 20 of Figure 8 is used, and in this instance the ends 20 and 22 provide a lap seam rather than a turned finned seam. The whole is then secured together under the bracket 19A by heat-sealing.

In the method of providing this balloon having the load supporting members, tensile supporting members are first placed in elongation within synthetic resinous tapes and the tapes are then bonded to the junctures of a multi-gored balloon. The tapes terminate at the apex of the balloon and the tensile supporting members are secured to support means (in this instance the ring). The tapes likewise terminate at the appendix of the balloon and the tensile members serve to support second support means (in this instance the D-ring) from which the payload is suspended. The tensile member may be positioned within a loop of synthetic resinous tape and free for axial movement therein, or substantially immobilized in the less preferred form. The tapes may comprise sheaths for the cable but usually have opposing portions brought into juxtaposition to form a linear edge parallel to the cable or tensile member and the assemblies of the tensile members and tapes are then heat-bonded to the balloon envelope, at least throughout the linear edge portions.

As many widely differing embodiments of this invention may be made without departing from the spirit and scope thereof, it is to be understood that the specific embodiments described are given by way of example only and the invention is limited only by the terms of the appended claims.

What is claimed:

1. A balloon having an apex end and an appendix end, a plurality of gores extending from the apex end to the appendix end of the balloon, adjacent edges of the gores being externally turned and positioned in abutment to produce a finned juncture, linear load bearing assemblies secured to some of said junctures and extending throughout substantial portions thereof, said load bearing assemblies comprising a reinforcing filamentous element positioned within an elongated sheath, a portion of said elongated sheath providing an edge portion, a portion of said elongated sheath providing a loop portion within which said filamentous member is slidably positioned, and said edge portions overlying at least one of said turned edges and secured thereto by a fused portion.

2. The structure of claim 1 further characterized in that said turned edges providing said finned junctures are secured to said edge portion for said load bearing assembly throughout a common fused portion.

References Cited in the file of this patent

UNITED STATES PATENTS

| | | |
|---|---|---|
| 1,563,571 | Huffman et al. | Dec. 1, 1925 |
| 2,067,405 | Mayne | Jan. 12, 1937 |
| 2,318,674 | Coleman | May 11, 1943 |
| 2,598,696 | Huch | June 3, 1952 |
| 2,679,224 | Sturtevant | May 25, 1954 |
| 2,767,941 | Gegner et al. | Oct. 23, 1956 |
| 2,858,090 | Winzen et al. | Oct. 28, 1958 |